(12) United States Patent
Murakami et al.

(10) Patent No.: US 7,413,241 B2
(45) Date of Patent: Aug. 19, 2008

(54) CAB OF A WORKING MACHINE

(75) Inventors: Yoshiaki Murakami, Hiroshima (JP); Terumi Asai, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 11/531,937

(22) Filed: Sep. 14, 2006

(65) Prior Publication Data

US 2007/0085380 A1  Apr. 19, 2007

(30) Foreign Application Priority Data

Oct. 14, 2005  (JP) ............... 2005-299739

(51) Int. Cl.
  *B62D 33/06* (2006.01)
  *B60R 21/11* (2006.01)
(52) U.S. Cl. .............. 296/190.08; 296/193.06; 296/205; 180/89.12; 280/756
(58) Field of Classification Search ........... 296/187.12, 296/187.13, 190.01, 190.03, 190.08, 193.06, 296/193.12, 203.01, 205, 203.03, 29, 102; 180/89.12; 280/756

See application file for complete search history.

(56) References Cited

U.S. PATENT DOCUMENTS

| | | | | |
|---|---|---|---|---|
| 1,747,451 A | * | 2/1930 | Marshall | ............. 296/192 |
| 3,791,668 A | * | 2/1974 | Adams | ............. 280/756 |
| 4,032,187 A | | 6/1977 | Atherton | |
| 4,605,259 A | * | 8/1986 | Hurlburt | ............. 296/190.08 |
| 4,650,242 A | * | 3/1987 | Obe et al. | ............. 296/190.08 |
| 5,636,867 A | * | 6/1997 | McNabb et al. | ............. 280/756 |
| 5,810,428 A | * | 9/1998 | Maki | ............. 296/203.02 |
| 5,820,199 A | * | 10/1998 | Camplin et al. | ............. 296/102 |
| 6,189,955 B1 | * | 2/2001 | Fryk et al. | ............. 296/190.08 |
| 6,209,949 B1 | * | 4/2001 | Sakyo et al. | ............. 296/190.08 |
| 6,325,450 B2 | * | 12/2001 | Sakyo et al. | ............. 296/190.08 |
| 6,568,716 B1 | * | 5/2003 | Fieber | ............. 285/305 |
| 6,582,010 B2 | * | 6/2003 | Sakyo et al. | ............. 296/190.08 |
| 6,929,312 B2 | * | 8/2005 | Rich et al. | ............. 296/187.02 |
| 7,048,082 B2 | * | 5/2006 | Mori et al. | ............. 180/89.12 |

FOREIGN PATENT DOCUMENTS

| | | |
|---|---|---|
| GB | 2 306 921 A | 5/1997 |
| JP | 2004-42739 | 2/2004 |
| JP | 2004-42740 | 2/2004 |

OTHER PUBLICATIONS

Unified Engineering Inc., Fillet Welds, 1996 (C).*

* cited by examiner

*Primary Examiner*—D. Glenn Dayoan
*Assistant Examiner*—Greg Blankenship
(74) *Attorney, Agent, or Firm*—Oblon, Spivak, McClelland, Maier & Neustadt, P.C.

(57) ABSTRACT

A rear support pillar is configured by combining plural plate members extending in the longitudinal direction of the support pillar to define a closed section. An end face of one of plate members adjacent to each other in the closed section is abutted against an inner surface of the other plate member and in this state the abutted portion of the plate members is fillet-welded throughout the overall length of each plate member.

5 Claims, 12 Drawing Sheets

FIG. 1

FRONT ← → REAR

FRONT ← → REAR

CAB OF A WORKING MACHINE

BACKGROUND OF THE INVENTION

1. Field of the Invention

The present invention relates to a cab of a working machine such as a hydraulic excavator.

2. Description of the Related Art

Generally, a cab of a working machine encloses an operator's seat to protect the same seat. More particularly, the cap is provided with plural support pillars erected around the operator's seat.

There is such a support pillar wherein a closed section is formed by combining a plurality of pressed plates. In this type of support pillar, allowances for welding formed in a longitudinal direction of the constituent plates are brought into surface-contact with each other and are spot-welded intermittently in the longitudinal direction.

In such a support pillar, however, the thickness of each constituent plate cannot be set to a larger value than the thickness which permits the press working. Thus, a limit is encountered in point of the pillar strength. Further, since the constituent plates of this support pillar are joined intermittently in the longitudinal direction, joining strength between plates is weak.

In view of this point there is known a technique which adopts a pipe member as a portion of support pillars, as is disclosed for example in Japanese Patent Laid-Open Nos. 2004-42739 and 2004-42740. According to this technique, since the support pillar formed using the pipe member is of a single pipe member unlike the combination of plates having been subjected to press working, the anxiety about the joining strength is mitigated.

However, in the manufacturing process for the pipe member when adopted, it has so far been difficult to attain required sectional shape and sectional area.

Particularly, in the case of a support pillar as a frame of a working machine, it is desired to set a sectional shape so as to satisfy the strength and shape required for example in accordance with the place where the pillar is to be erected. However, providing the pipe member having a section which satisfies such a condition for each type of a working machine has so far been difficult in fact in point of cost and equipment.

SUMMARY OF THE INVENTION

It is an object of the present invention to provide a cab of a working machine having a frame which permits a sectional shape of a support pillar to be changed relatively freely while ensuring a required strength.

The cab of a working machine according to the present invention has the following basic configuration.

The cab of a working machine according to the present invention has plural support pillars erected around an operator's seat of the working machine and encloses the operator's seat to protect the same seat. At least one of the support pillars is configured by a combined support pillar formed by combining plural plate members extending in the longitudinal direction of the support pillar concerned to define a closed section. In the closed section, an end face in the transverse direction of one of adjacent plate members is abutted against an inner surface of the other plate member and in this state the abutted portion of the plate members is fillet-welded substantially throughout the overall length of each of the plate members.

According to the present invention, a specific support pillar is formed using plural plate members and has a configuration such that an end face in the transverse direction of one of adjacent plate members of the plate members is abutted against an inner surface of the other plate member and in this state both are welded together. With such a configuration, the sectional shape can be changed relatively freely while ensuring the strength required of this combined support configuration.

Thus, in the present invention, since an end face of one of adjacent plate members of the plate members as constituents of the combined support pillar is welded to the inner surface of the other plate member, the sectional shape, etc. can be changed relatively freely by for example selecting suitable plate members or changing the position where plate members are to be joined. For example, even when the plate members used are the same, a support pillar of a different sectional shape can be formed by changing the position where the plate members are to be welded.

In the present invention, moreover, the combined support pillar is formed using plural plate members, so unlike the case of forming the support pillar with use of a pipe member, the sectional shape (including thickness and outline) of each plate member can be changed relatively freely and thus support pillars of various sectional shapes can be formed by such changing of the sectional shape.

Further, in the conventional support pillar formed by plates having been subjected to press working, adjacent plates are spot-welded intermittently in the longitudinal direction in a state where allowances for welding of the plates are in surface-contact with each other. On the other hand, in the present invention, an end face of one of plate members adjacent to each other in a closed section is abutted against an inner surface of the other plate member and in this state the plate members are fillet-welded throughout the overall length of the plate members, so that it is possible to ensure a sufficient joining strength between the plate members.

In the present invention it does not matter in which position the combined support pillar is to be erected. However, it is preferable that the combined support pillar include a support pillar erected behind the operator's seat.

In this case, also in the space behind the operator's seat which space is limited by a large number of constituent members installed in the working machine, it is possible to erect a support pillar after adjusting its sectional shape correspondingly to the space.

Particularly, the support pillar disposed behind the operator's seat is required to have a high strength and it is possible to meet flexibly both requirement for the strength and requirement for the shape in the limited space, for example, by selecting suitable plate members or changing the position where plate members are to be joined.

In case of erecting a pair of right and left support pillars behind the operator's seat, it is ideal to adopt combined support pillars for both right and left support pillars.

Preferably, in the cab of a working machine described above, the plate members include a pair of opposed plate members disposed so that respective inner surfaces confront each other and a pair of interposing plate members interposed between the inner surfaces of the opposed plate members, and a closed section of a quadrangular shape is formed by the opposed plate members and the interposing plate members.

In this case, two interposing plate members are interposed between both opposed plate members, so when an external force is applied to one of the opposed plate members, the external force can be transmitted to the other of the opposed plate members through the interposing plate members. Therefore, when a high strength is required against an external force acting in a specific direction, the foregoing requirements can be met by disposing the opposed plate members so as to intersect the above-mentioned direction.

In this connection, it is preferable for the opposed plate members to be disposed in such a manner that the respective inner surfaces confront each other in the longitudinal direction of the working machine.

In this case, it is possible to prevent the combined support pillar from undergoing a flexural deformation in the longitudinal direction of the working machine. As a result, it is possible to protect the operator's seat in a more positive manner. That is, the cab is required to protect the operator's seat in the event the working machine should turn upside down. However, by constructing the combined support pillar so as to be difficult to undergo a flexural deformation in the longitudinal direction as described above, it is possible to prevent the cab from tilting forward or backward upon overturn of the working machine. Thus, the operator's seat can be protected more positively.

In the cab of a working machine described above it is preferable that the plate members include a plate member having at least one bent portion in the closed section.

In this case, at least two of the side faces of the support pillar can be formed by a single plate member, so that the number of the plate member welding steps can be reduced in comparison with the case where the two faces are formed by welding two plate members, and thus the working efficiency in manufacturing the support pillar can be improved.

Further, if at least one plate member formed with the foregoing end face is fillet-welded on both its surface side and back side to the inner surface of the mating plate member, the joining strength can be improved to a greater extent than in case of performing the fillet welding on one of the surface and the back.

BRIEF DESCRIPTION OF THE DRAWINGS

FIGS. 11A and 11B are diagrams corresponding to FIG. 8C, showing a rear support pillar according to a still further embodiment of the present invention, of which FIG. 11A shows an L-shaped bent plate member and FIG. 11B shows a ⊐-shaped bent plate member; and FIGS. 12A and 12B are diagrams corresponding to FIG. 8C, showing a rear support pillar configured by a combination of the bent plate member of FIG. 11A and a bent plate member according to a still further embodiment of the present invention, of which FIG. 12A shows an enlarged sectional shape and FIG. 12B shows a reduced sectional shape.

DESCRIPTION OF THE PREFERRED EMBODIMENTS

Preferred embodiments of the present invention will be described hereinunder with reference to the drawings.

Figure 1:
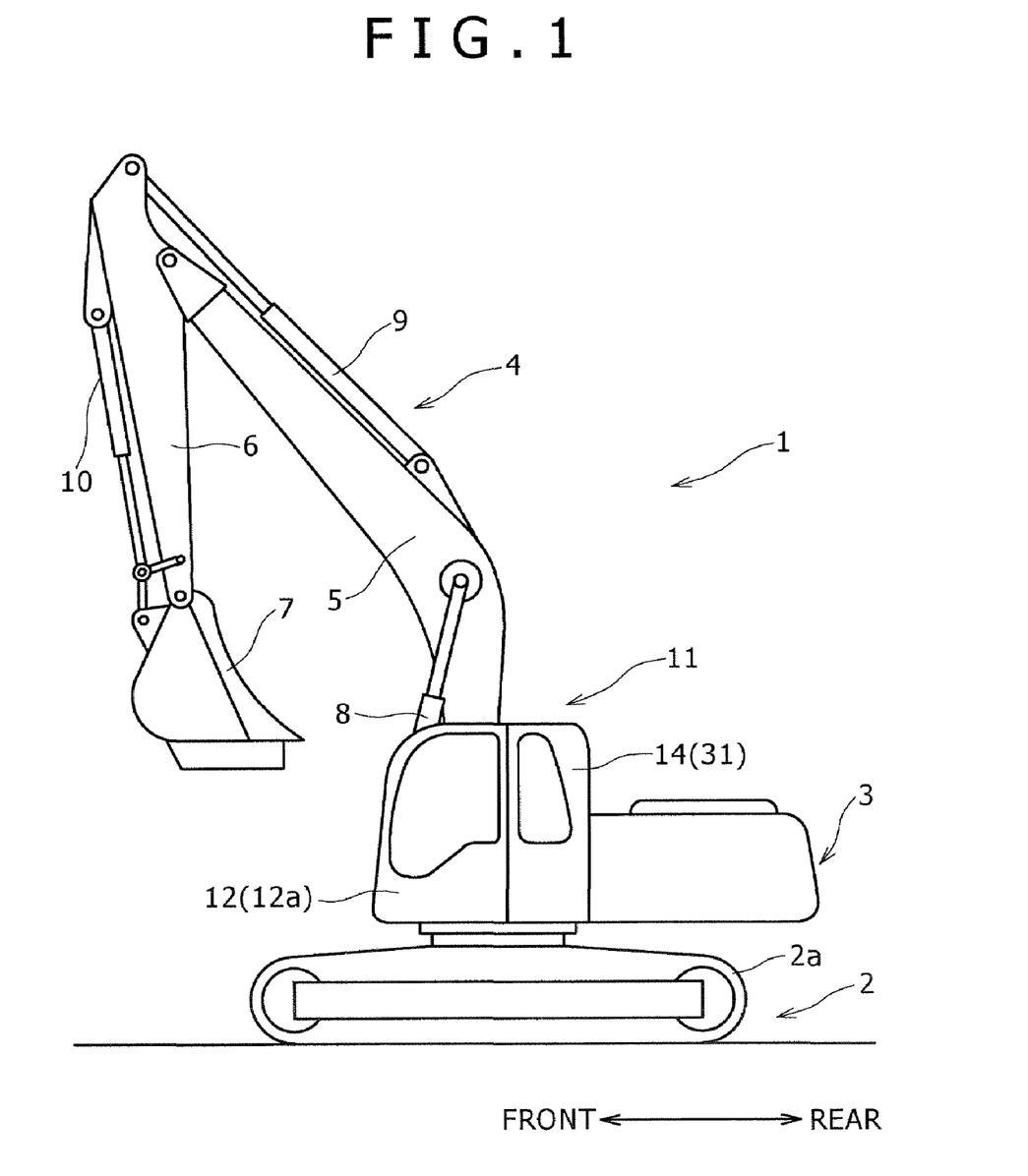
FIG. 1 is a side view showing an entire configuration of a hydraulic excavator according to an embodiment of the present invention.

FIG. 1 is a side view showing an entire configuration of a hydraulic excavator according to an embodiment present invention.

Referring to FIG. 1, a hydraulic excavator 1 as an example of a working machine includes a lower traveling body 2 having crawlers 2a, an upper rotating body 3 mounted rotatably on the lower traveling body 2, and an attachment 4, the attachment being attached to a front portion of the upper rotating body 3 so that it can rise and fall.

The attachment 4 is made up of a boom 5 and an arm 6 connected to a front end of the boom 5, with a bucket 7 being mounted pivotably to a front end of the arm 6.

The boom 5 is adapted to rise and fall with extending and retracting motions of the a boom cylinder 8, the arm 6 is adapted to move pivotally with extending and retracting motions of an arm cylinder 9, and the bucket 7 is adapted to move pivotally relative to the arm 6 with extending and retracting motions of a bucket cylinder 10.

On the upper rotating body 3 is mounted a cab 11 which encloses an operator's seat (not shown) to protect the same seat. In the following description, front, rear and right, left directions are directions as seen by the eyes of an operator sitting on the operator's seat.

Figure 2:
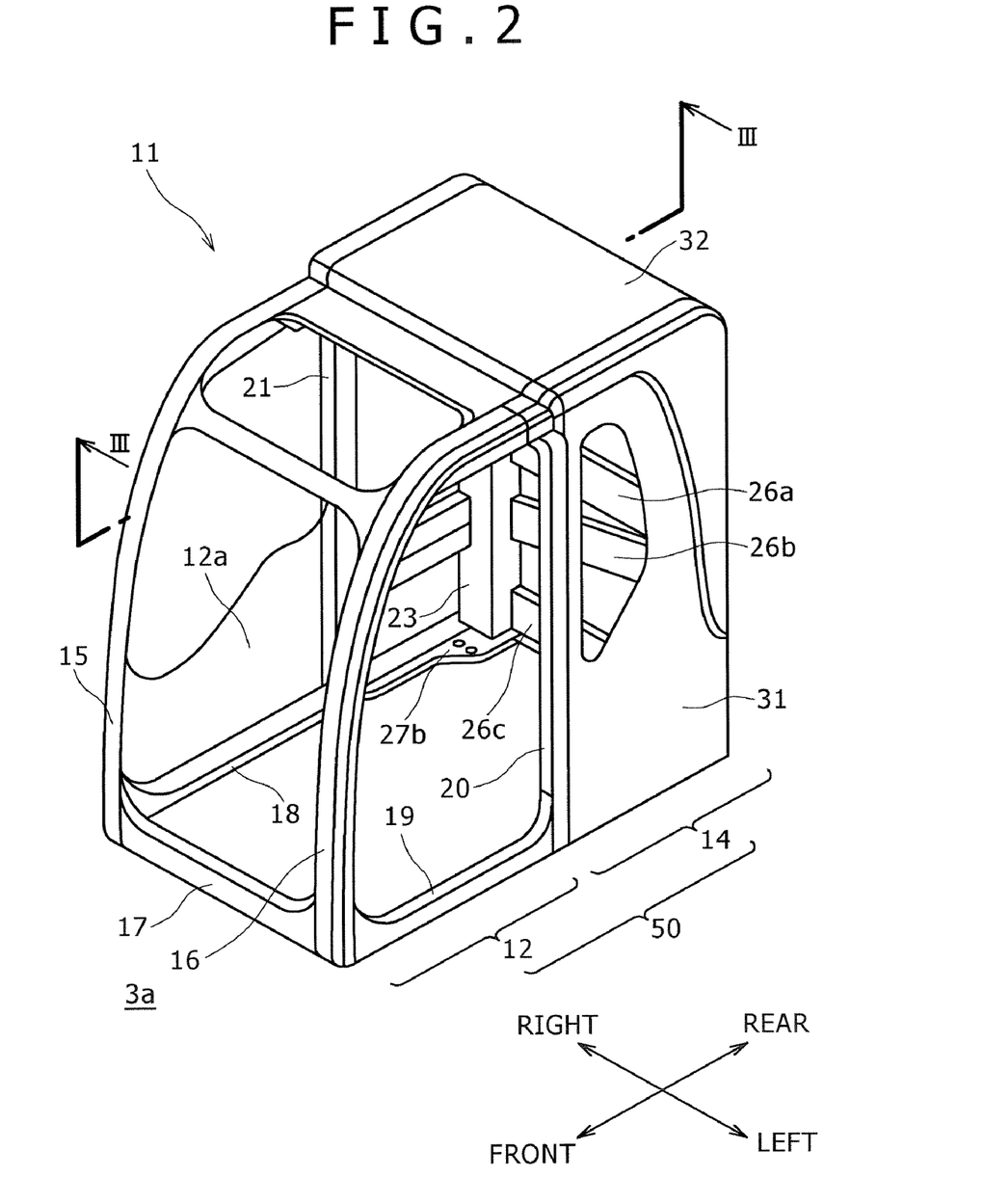
FIG. 2 is a perspective view showing on an enlarged cab shown in FIG. 1.
Figure 3:
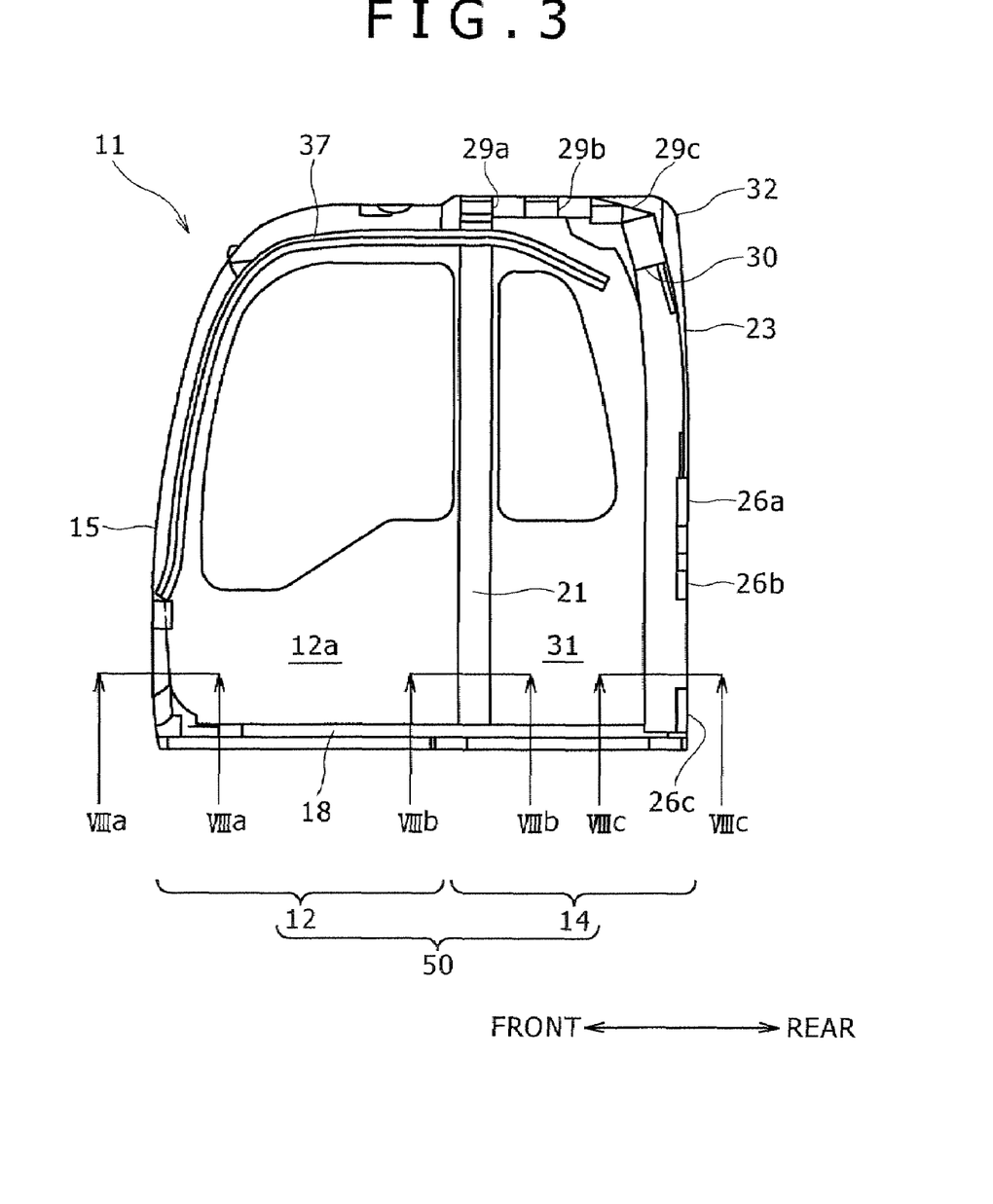
FIG. 3 is a sectional view taken on line III-III in FIG. 2.

FIG. 2 is a perspective view showing the enlarged cab 11 shown in FIG. 1. FIG. 3 is a sectional taken on line III-III in FIG. 2.

Referring to FIGS. 1 to 3, the cab 11 includes a frame 50 which configures the profile of the cab, panels (indicated at 12a, 31 and 32 in the figures) which are secured to the frame 50 outside or inside the frame to define an operator room, and rails 37 disposed inside the frame 50 (within the operator room).

The frame 50 comprises a front section 12 and a back section 14, both sections 12 and 14 being connected together longitudinally.

The front section 12 includes a right front support pillar 15, a left front support pillar 16, the pillars 15 and 16 being erected in front of the operator's seat (not shown), a front connecting frame 17 for connecting lower end portions of the support pillars 15 and 16 in the transverse direction, and a right front frame 18, and a left front frame 19, the frames 18 and 19 extending backward from the lower end portions of the support pillars 15 and 16.

Figure 8A:
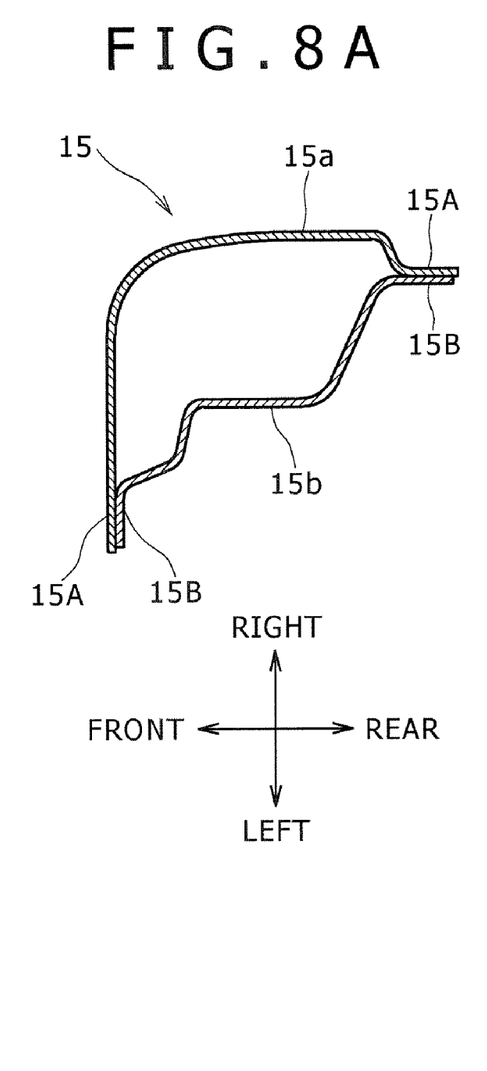
FIG. 8A is a sectional view taken on line VIIIa-VIIIa in FIG. 3.

As shown in FIG. 8A, the right front support pillar 15 comprises thin plates 15a and 15b having been subjected to press working. The thin plates 15a and 15b are joined together to form a closed section. More specifically, the thin plates 15a and 15b are spot-welded intermittently in a state in which allowances 15A and 15B for welding formed longitudinally on both sides in the transverse direction of the thin plates are in surface-contact with each other. Sectional shapes of the right and left support pillars 15 and 16 are symmetric right and left and therefore an explanation of the left front support pillar 16 will be omitted.

As shown in FIGS. 2 and 3, both front support pillars 15 and 16 extend upward from a base 3a of the upper rotating body 3 and are bent backward and their rear end portions are joined to the back section 14.

The right and left front frames 18 and 19 extend backward from the lower end portions of the front support pillars 15 and 16 respectively and their rear end portions are joined to the back section 14.

Figure 4:
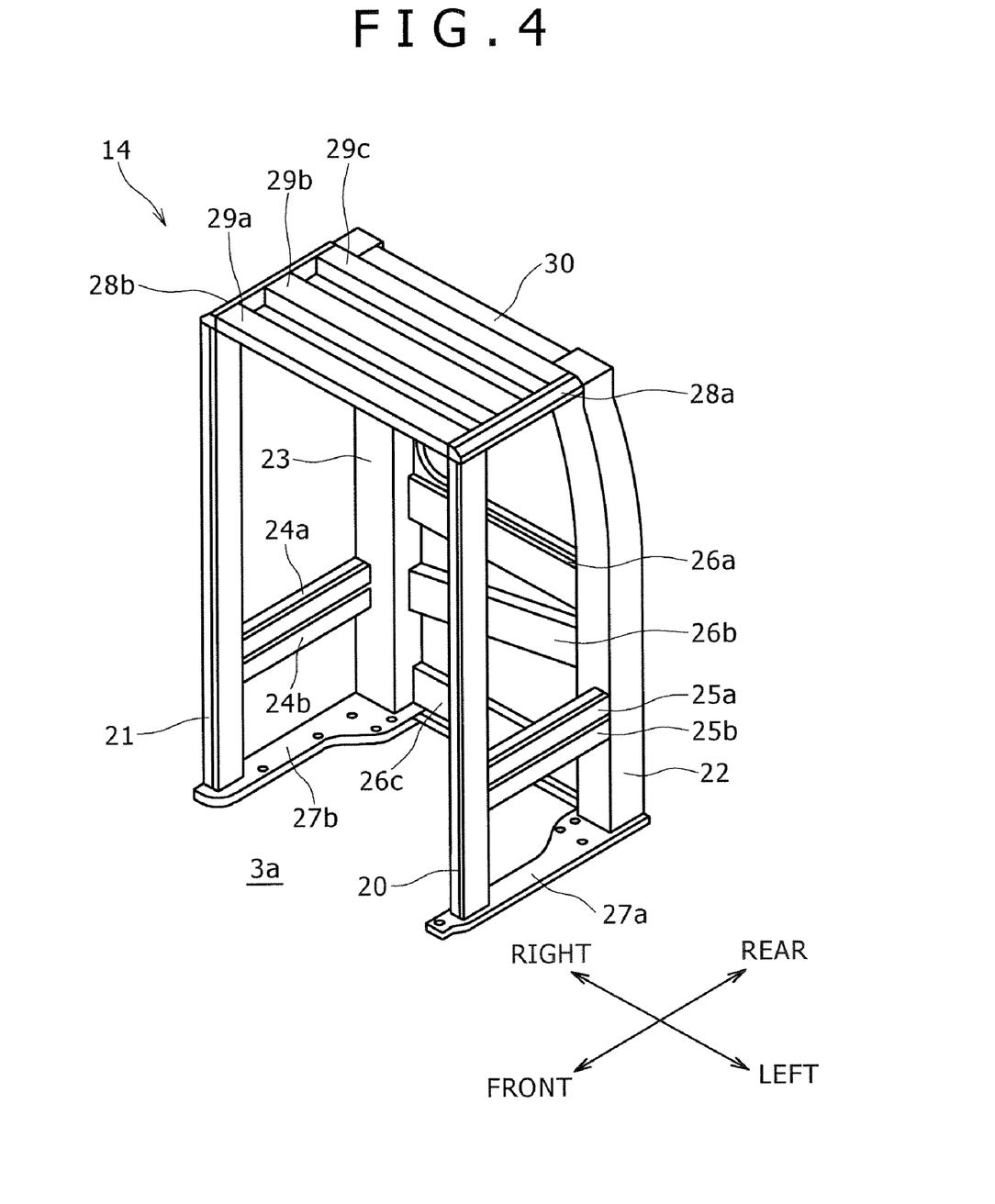
FIG. 4 is a perspective view showing the configuration of a back section of FIG. 2.
Figure 5:
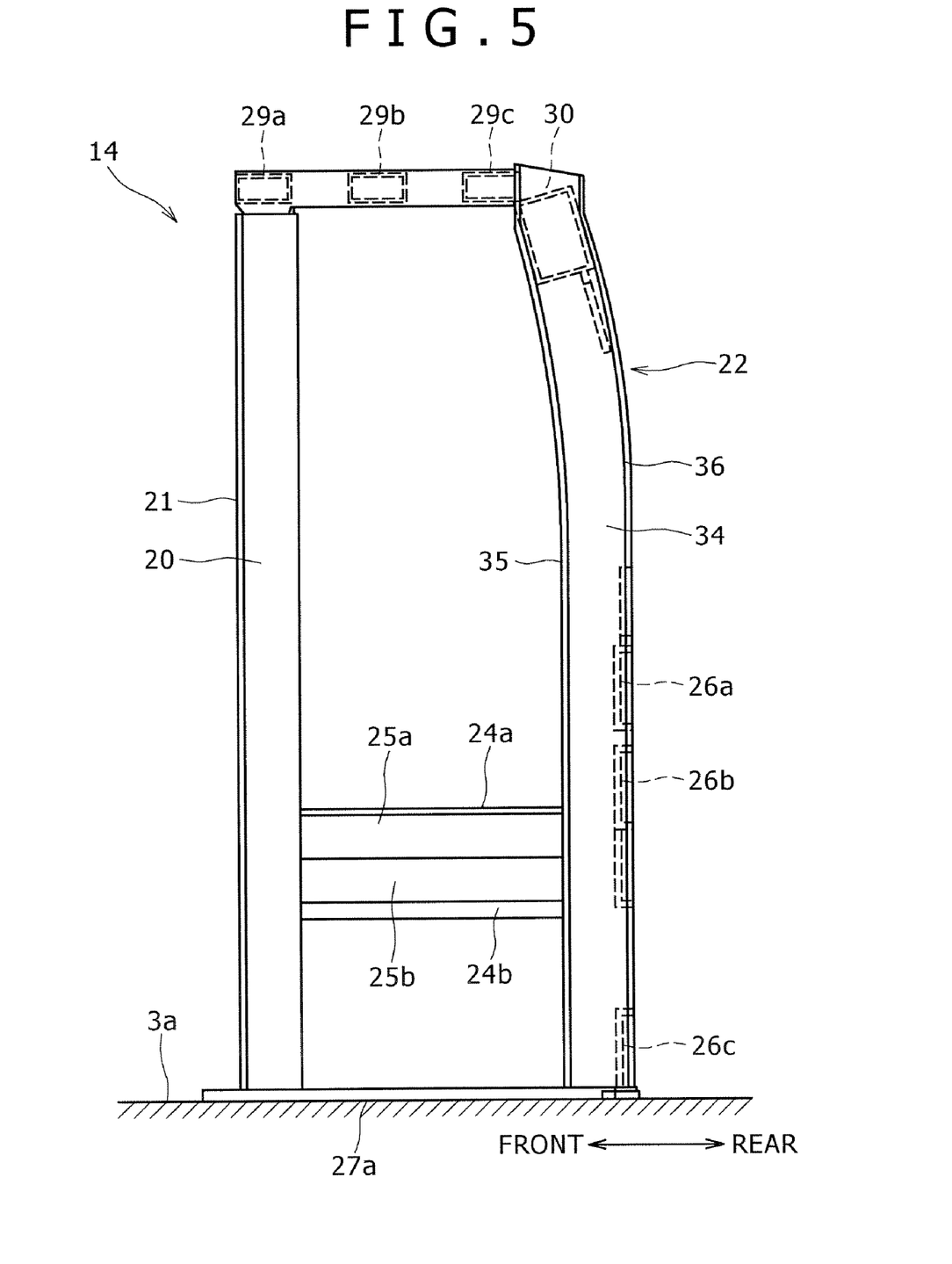
FIG. 5 is a side view of the back section of FIG. 4.
Figure 6:
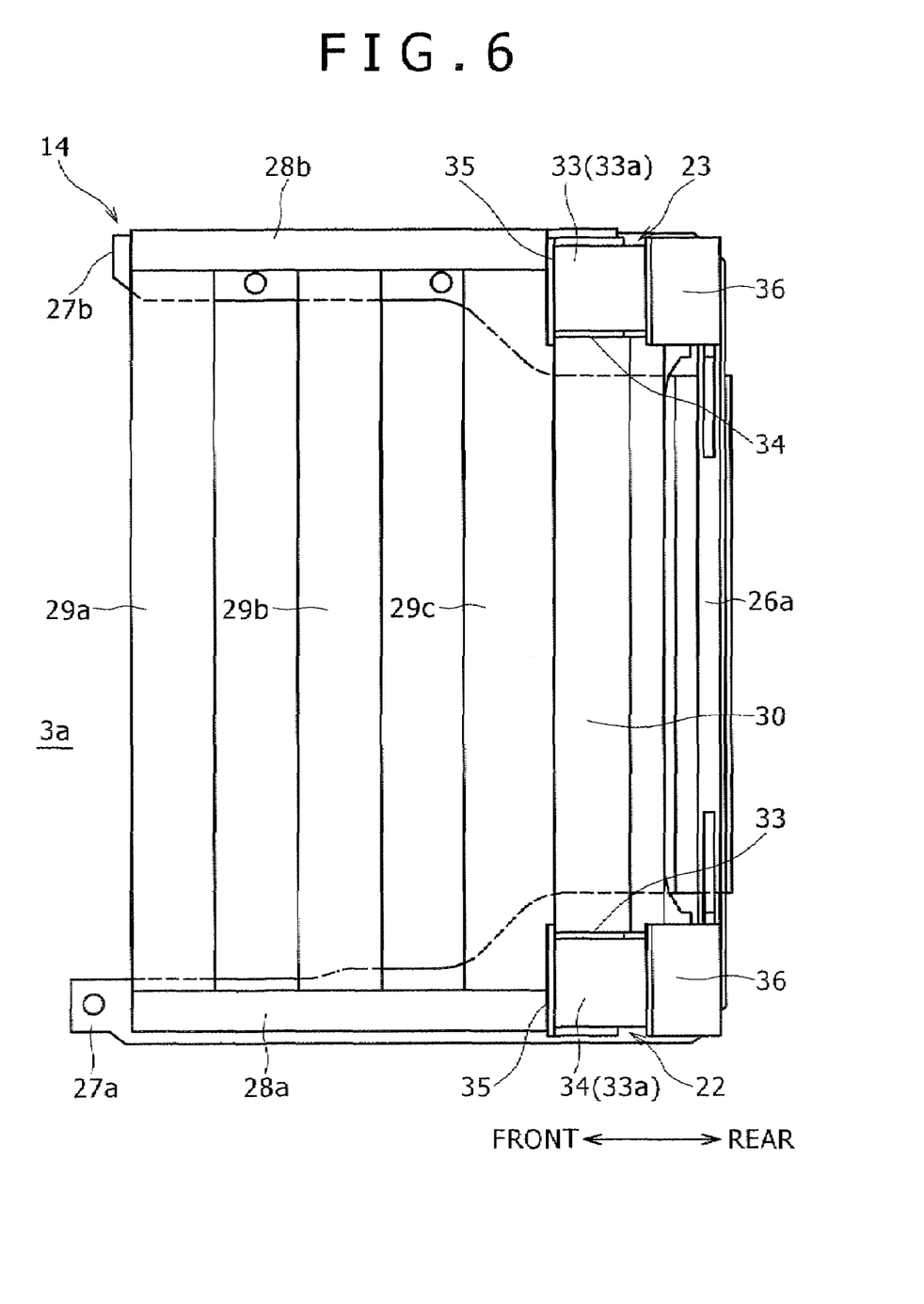
FIG. 6 is a plan view of the back section of FIG. 4.

FIG. 4 is a perspective view showing the configuration of the back section of FIG. 2, FIG. 5 is a side view of the back section of FIG. 4, and FIG. 6 is a plan view of the back section of FIG. 4.

Referring to FIGS. 3 to 6, the back section 14 includes a left mounting plate 27a, a right mounting plate 27b, both plates 27a and 27b being fixed onto the base 3a of the upper rotating body 3, a mid-left support pillar 20, a mid-right support pillar 21, the support pillars 20 and 21 being erected on front portions of the mounting plates 27a and 27b respectively, a rear left support pillar 22, a rear right support pillar 23, the support pillars 22 and 23 being erected on rear portions of the mounting plates 27a and 27b respectively, and connecting frames for connecting the support pillars 20 to 23.

More specifically, the connecting frames include an upper left frame 28a for connecting upper end portions of the mid-left support pillar 20 and the rear left support pillar 22 with each other longitudinally, lower left frames 25a and 25b provided in a pair of upper and lower frames for connecting lower portions of the support pillars 20 and 22 with each other, an upper right frame 28b for connecting upper end portions of the mid-right support pillar 21 and the rear right support pillar 23 with each other longitudinally, lower right frames 24a and 24b provided in a pair of upper and lower frames for connecting lower portions of the support pillars 21 and 23 with each other longitudinally, a rear upper frame 30 for connecting upper end portions of the rear left support pillar 22 and the rear right support pillar 23 with each other transversely, rear mid-frames 26a and 26b provided in a pair of upper and lower frames for connecting intermediate portions of the support pillars 22 and 23 with each other transversely, a rear lower frame 26c for connecting lower portions of the support pillars 22 and 23 with each other transversely, and three longitudinally juxtaposed upper frames 29a, 29b and 29c for connecting the upper left and right frames 28a, 28b with each other transversely.

Figure 8B:
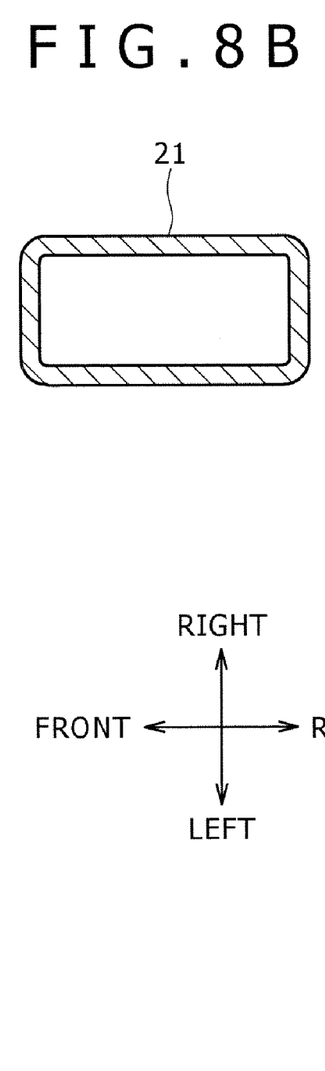
FIG. 8B is a sectional view taken on line VIIIb-VIIIb in FIG. 3.

As shown in FIG. 8B, the mid-right support pillar 21 is a pipe member of a generally rectangular section whose length direction corresponds to the longitudinal direction. The mid-left support pillar 20 also has the same closed section and therefore an explanation thereof is here omitted. The rear end portions of the front support pillars 15 and 16 are joined to upper portions of the support pillars 20 and 21 respectively, while the rear end portions of the right and left front frames 18 and 19 are joined to lower portions of the pillars 20 and 21 respectively.

The rear left support pillar 22 and the rear right support pillar 23 (hereinafter referred to generically as the rear support pillars 22 and 23 unless distinction is needed) have a side shape such that they extend upward from the mounting plates 27a and 27b respectively, then their upper portions are inclined forward and their upper end portions extend upward.

Figure 8C:
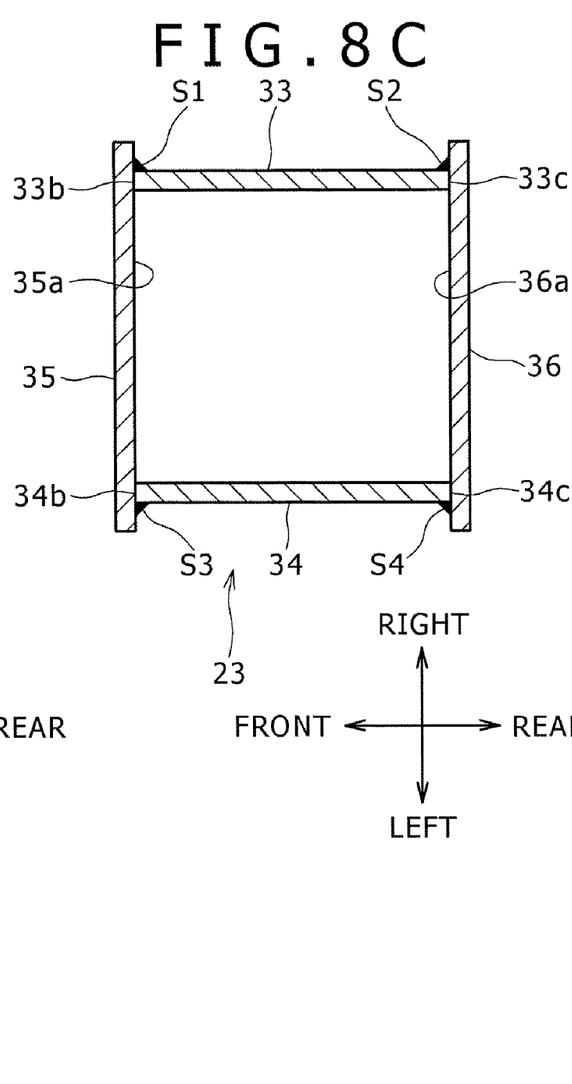
FIG. 8C is a sectional view taken on line VIIIc-VIIIc in FIG. 3.
Figure 9:
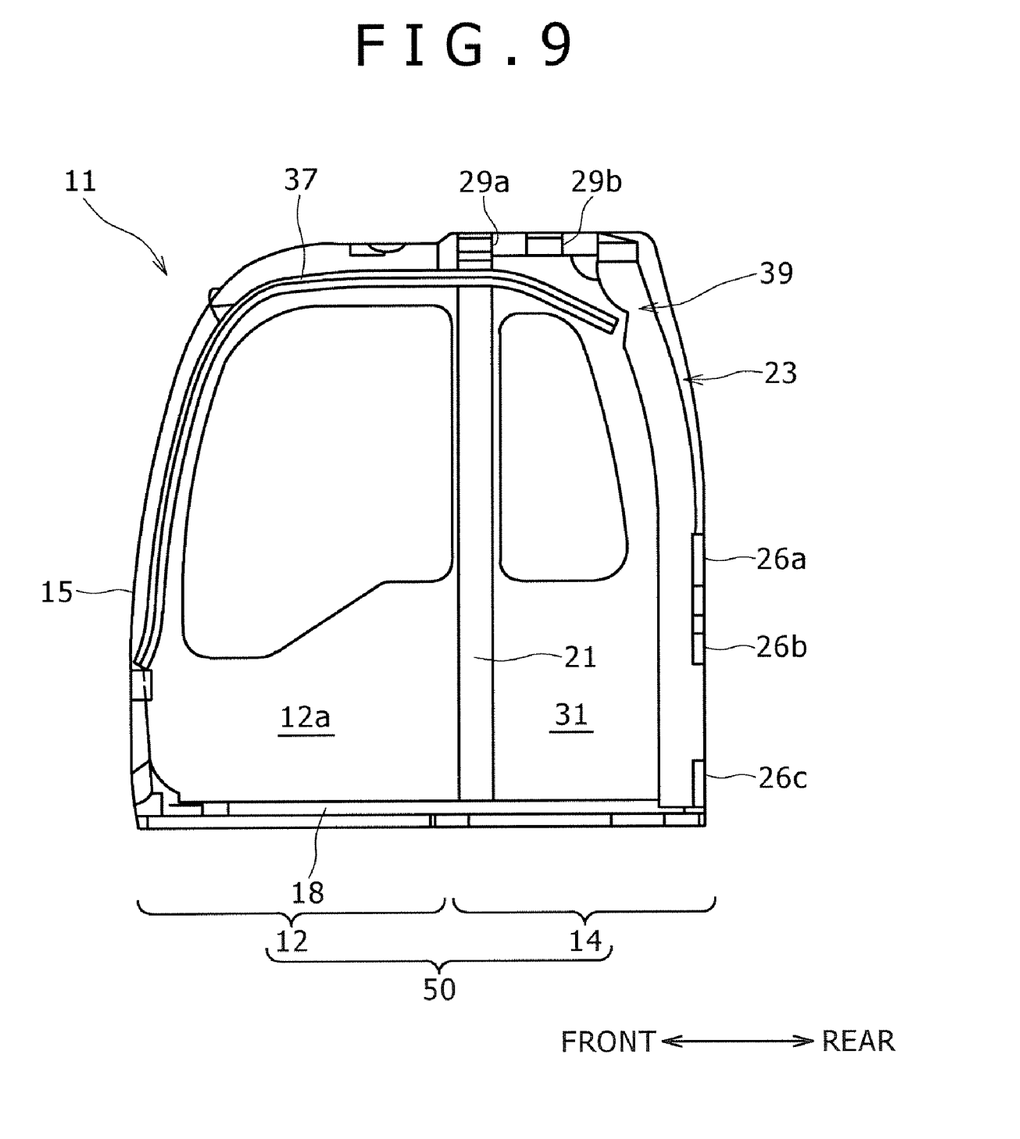
FIG. 9 is a diagram corresponding to FIG. 3, showing a cab according to another embodiment of the present invention.

More particularly, as shown in FIG. 8C, the rear support pillars 22 and 23 are each formed so as to have a generally square closed section by combining four plate members 33 to 36 which extend in the longitudinal direction of the rear support pillars 22 and 23.

Figure 7:
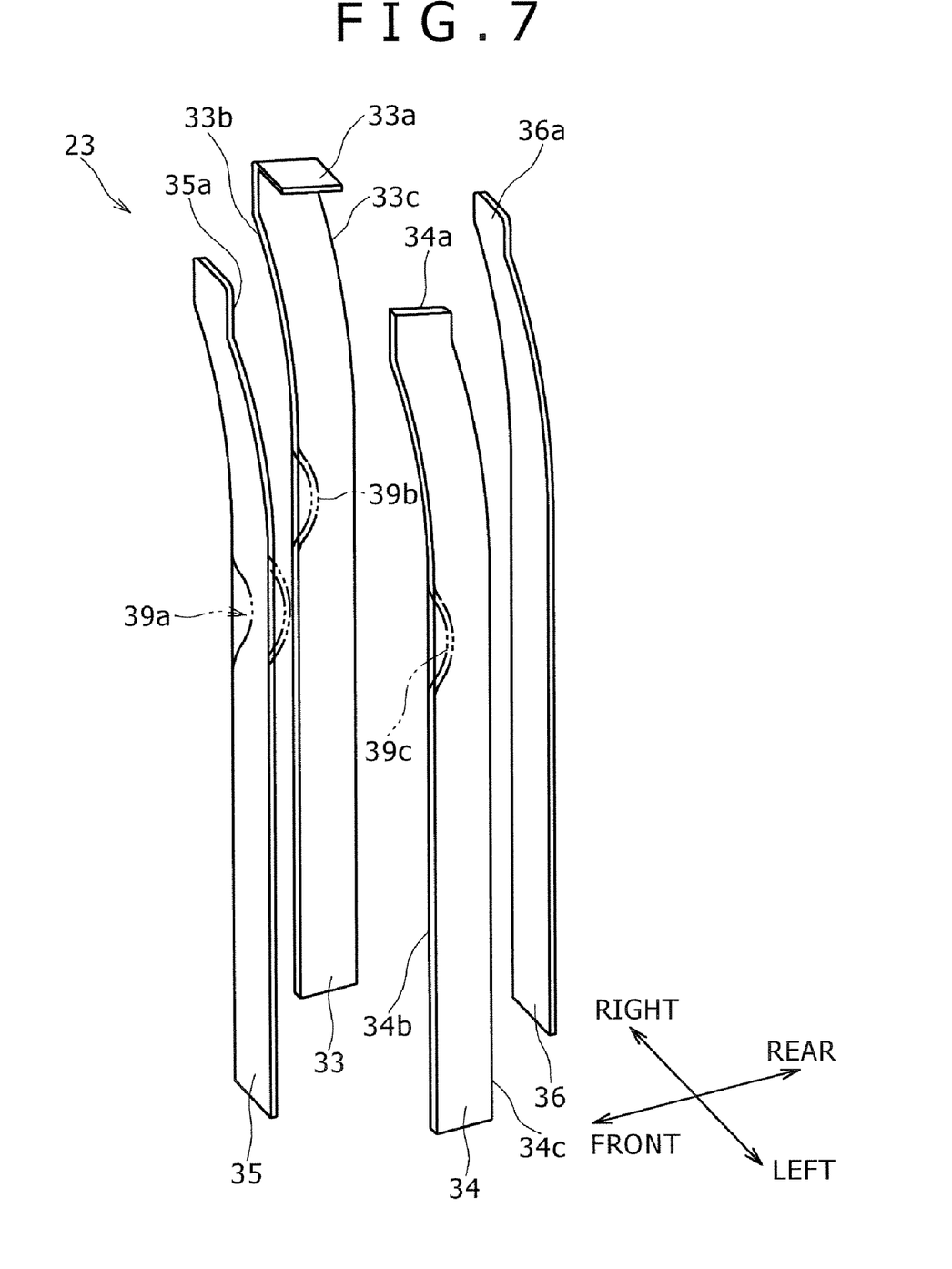
FIG. 7 is an exploded perspective view of a right rear support pillar shown in FIG. 4.

As shown in FIGS. 7 and 8C, the rear right support pillar 23 comprises a right plate member (interposing plate member) 33, a left plate member (interposing plate member) 34, the right and left plate members 33 and 34 having a planar shape corresponding to the side shape of the rear right support pillar 23, a front plate member (opposed plate member) 35, and a rear plate member (opposed plate member) 36, the front and rear plate members 35 and 36 sandwiching the right and left plate members 33 and 34 longitudinally.

An upper end portion of the right plate member 33 is formed as a lid portion 33a which is bent leftwards. Peripheral portions of the lid portion 33a are welded to an upper end face of the left plate member 34, an inner surface (rear surface) 35a of the front plate member 35 and an inner surface (front surface) 36a of the rear plate member 36, thereby closing an upper opening of the rear right support pillar 23.

A front end face 33b in the width direction (longitudinal direction) of the right plate member 33 is abutted against the inner surface 35a of the front plate member 35 and in this state there is performed fillet welding S1 throughout the overall length of the inner surface 35a, whereby the right plate member 33 is joined to the front plate member 35. Likewise, a rear end face 33c of the right plate member 33 is abutted against the inner surface 36a of the rear plate member 36 and in this state there is performed fillet welding S2 throughout the overall length of the inner surface 36a, whereby the right plate member 33 is joined to the rear plate member 36.

The width size (longitudinal size) of the left plate member 34 is set almost equal to that of the right plate member 33.

A front end face 34b in the width direction of the left plate member 34 is abutted against the inner surface 35a of the front plate member 35 and in this state there is performed fillet welding S3 throughout the overall length of the inner surface 35a, whereby the left plate member 34 is jointed to the front plate member 35. Likewise, a rear end face 34c of the left plate member 34 is abutted against the inner surface 36a of the rear plate member 36 and in this state there is performed fillet welding S4 throughout the overall length of the inner surface 36a, whereby the left plate member 34 is joined to the rear plate member 36.

That is, the front plate member 35 is curved correspondingly to the side shape of the front end faces 33b and 34b of the right and left plate members 33 and 34, while the rear plate member 36 is curved correspondingly to the side shape of the rear end faces 33c and 34c of the right and left plate members 33 and 34.

The rear left support pillar 22 is different from the rear right support pillar 23 only in that the lid portion 33a is formed on the left plate member 34, and other configuration points are the same as those of the rear right support pillar 23, and therefore an explanation of the rear left support pillar 22 is here omitted.

Referring again to FIG. 3, the rails 37 support a front window (not shown) sidably on both right and left sides, the front window being disposed in a front portion of the cab 11. Thus, the rails 37 are provided on the right and left within the cab 11 (only one is shown in FIG. 3).

More specifically, the rails 37 extend upward along inner side faces (the operator room side) of the front support pillars 15 and 16, then are bent rearwards, pass inside the mid-support pillars 20 and 21, and their rear end portions extend up to positions near the front sides of the rear support pillars 22 and 23.

With the rails 37, the front window (not shown) can be slid between a basic attitude thereof wherein it is located in the front portion of the cab 11 and a storage attitude thereof wherein it is located inside an upper portion of the cab 11.

According to the cab 11 of the hydraulic excavator 1, as described above and as shown in FIGS. 7 and 8A to 8C, the rear support pillars 22 and 23 are each formed by four plate members 33 to 36 and fillet weldings S1 to S4 are performed in a state in which end faces 33b, 33c, 34b and 34c of the plate members 33 and 34 are abutted against the inner surfaces 35a and 36a of the plate members 35 and 36. According to this configuration, the sectional shape can be changed relatively freely while ensuring the strength required of the support pillar concerned.

That is, in the cab 11, end faces 33b, 33c, 34b and 34c of the plate members 33 and 34 out of the four plate members 33 to 36 which configure the rear support pillars 22 and 23 are welded to the inner surfaces 35a and 36a of the plate members 35 and 36 adjacent thereto, so that the sectional shape, etc. can be changed relatively freely, for example, by selecting suitable plate members 33 to 36 or by changing the positions of fillet weldings S1 to S4. For example, the front and rear plate members 35 and 36 are of the same shape in the above embodiment. But also in this case the sectional shape of the rear support pillars 22 and 23 can be changed by changing the positions of fillet weldings S1 to S4 without changing the shape of the front and rear plate members 35 and 36.

Further, in the cab 11, the rear support pillars 22 and 23 are each formed by plural plate members 33 to 36. Therefore, in comparison with the case where the rear support pillars 22 and 23 are each formed using a pipe member, the sectional shape of each of the plate members 33 to 36 can be changed relatively freely and rear support pillars 22 and 23 of various sectional shapes can be formed by such changing of the sectional shape.

That is, in the case of a pipe member, a correlation between its sectional area and section shape is limited to a certain extent. Therefore, when an attempt is made to enlarge the sectional area of a pipe member in reply to a requirement for a higher strength of the pipe member, the sectional shape of the pipe member must also be made large uniformly on the basis of a correlation thereof with the sectional area. Thus, in case of adopting a pipe member having a sectional area larger than necessary, it is impossible to avoid interference with surround constituent parts such as the rails 37. In this connection, it may be effective to adopt a method wherein the sectional shape of a pipe member is made into a shape capable of avoiding interference with constituent parts, i.e., a deformed section, and then enlarge the sectional area. However, the pipe member itself of such a specific specification as a deformed section is expensive and causes an increase of cost. Besides, for forming a deformed section, the thickness of the pipe member is limited to a predetermined small value and hence it becomes difficult to achieve the object of the present invention, i.e., strengthening the pipe member.

Thus, in the case of a pipe member, the degree of freedom in design is limited with respect to the sectional area and sectional shape.

On the other hand, in the cab 11, the sectional shape (including thickness and outline) of each of the plate members 33 to 36 and the positions to be joined by fillet weldings S1 to S4 can be changed relatively freely, whereby the sectional shape and strength of the rear support pillars 22 and 23 can be adjusted. Therefore, the foregoing limitations imposed in case of adopting a pipe member can be avoided.

Besides, in the case of a support pillar (e.g., the front support pillar 15 shown in FIG. 8A) formed by pressed plates, the plates are spot-welded intermittently in the longitudinal direction in a state in which allowances for welding (15A and 15B in FIG. 8A) of plates are in surface-contact with each other. On the other hand, in the rear support pillars 22 and 23 of the cab 11, end faces of plate members 33 and 34 which are adjacent to each other in a closed section are abutted against the inner surfaces 35a and 36a of the plate members 35 and 36 and in this state fillet weldings S1 to S4 are performed for the plate members 33 to 36 throughout the overall length of each plate member. Consequently, it is possible to ensure a sufficient joining strength among the plate members 33 to 36.

In addition, for press working into such a complicated shape as that of the thin plates 15a and 15b shown in FIG. 8A, it is necessary that the thickness of the thin plates 15a and 15b be set fairly thin. But in case of forming the rear support pillars 22 and 23 by such strip-like plate members 33 to 36 as shown in FIGS. 7 and 8C, it is possible to ensure a large thickness. Thus, also in point of thickness, it is possible to ensure a higher joining strength than in case of joining the thin plates 15a and 15b which have been subjected to press working.

After the plate members 33 to 36 are thus made thick, the end faces 33b, 33c, 34b and 34c of the plate members 33 and 34 are abutted against the inner surfaces 35a and 36a of the plate members 35 and 36 and welding is performed in this state. Also by this abutment the section modulus of the rear support pillars 22 and 23 can be made large.

Although in the above embodiment each of the left and right rear support pillars 22 and 23 is formed by the plate members 33 to 36, only one of the rear support pillars may be formed by the plate members 33 to 36.

In place of or in addition to the left and right rear support pillars 22 and 23 any or all of the right front support pillar 15, left front support pillar 16, mid-left support pillar 20, and mid-right support pillar 21, may be formed by the plate members 33 to 36.

That is, it suffices if at least one of the rear support pillars 22 and 23, front support pillars 15 and 16 and mid-support pillars 20 and 21 is formed by the plate members 33 to 36. In this case, a concrete mode of the other support pillars than the support pillar (combined support pillar) formed by the plate members 33 to 36 is not specially limited, but may be set appropriately in accordance with desired conditions.

In the case where the rear support members 22 and 23 are not formed by the plate members 33 to 36, they may be formed by such a pipe member as shown in FIG. 8B.

Further, the upper left frame 28a, upper light frame 28b, lower left frames 25a and 25b, lower right frames 24a and 24b, rear upper frame 30, rear mid-frames 26a and 26b, rear lower frame 26c, and upper frames 29a, 29b and 29c may each be formed by the plate members 33 to 36.

In the above embodiment the right and left plate members 33 and 34 are disposed bridgewise between the inner surfaces 35a and 36a of the front and rear plate members 35 and 36. Therefore, when an external force is applied to one of the front and rear plate members 35 and 36, the external force can be transmitted to the opposite-side plate member 35 or 36 through the right and left plate members 33 and 34. Consequently, the strength of the rear support pillars 22 and 23 can be improved against an external force applied thereto in the longitudinal direction.

The above embodiment refers to the configuration wherein the rear end portions of the rails 37 and the rear support pillars 22 and 23 do not interfere with each other, as shown in FIG. 3. However, the positions where the rear support pillars 22 and 23 are to be erected, as well as the shape of those pillars, are limited for example due to a requirement for the reduction in size of the cab 11. As a result, there sometimes occurs a case where the rear support pillars 22 and 23 interfere with other constituent members, e.g., rails 37.

For example, when there occurs the necessity of erecting the rear support pillars 22 and 23 in a more forwardly inclined attitude, the rear support pillars 22 and 23 interfere with the rails 37 longitudinally. Even in such a case, the interference between the rear support pillars 22 and 23 and the rails 37 can be avoided by forming a depression 39 in each of the rear support pillars 22 and 23.

More specifically, as shown in FIG. 7, a curved recess 39a is formed in the front plate member 35 correspondingly to the shape of a side face of each rail 37 and cutout portions 39b and 39c are formed respectively in the right and left plate members 33 and 34 correspondingly to the curved recess 39a, whereby the depression 39 as a partial longitudinal depression can be formed in each of the rear support pillars 22 and 23.

The rear support pillars 22 and 23 are each formed by a combination of the plate members 33 to 36. Before this combination, the surfaces of the plate members 33 to 36 which become inner surfaces after the combination may be subjected to various processing in advance.

Figure 10:
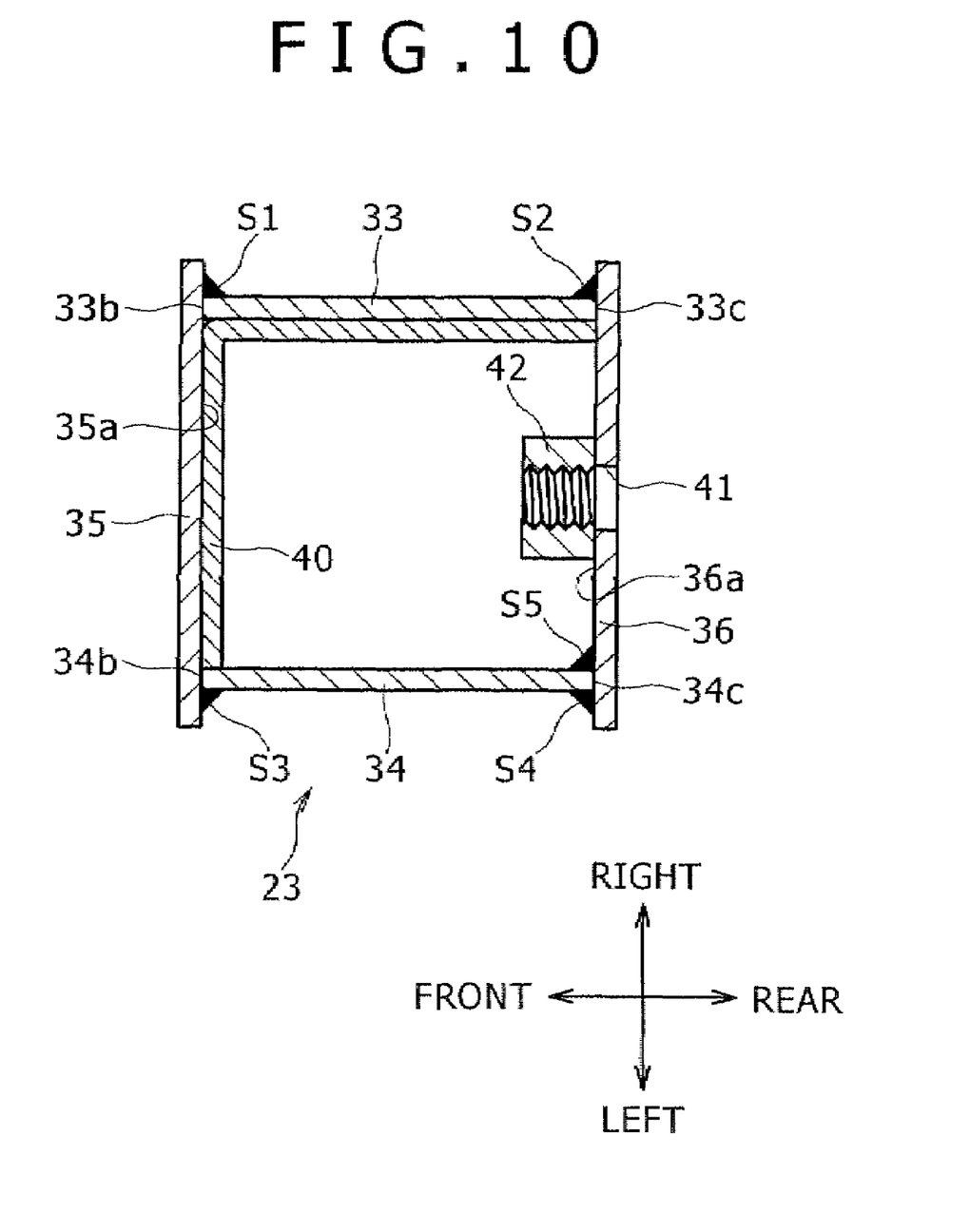
FIG. 10 is a diagram corresponding to FIG. 8C, showing a rear support pillar according to a further embodiment of the present invention.

For example, an L-shaped angle 40 may be provided bridgewise for two adjacent plate members (33 and 35 in FIG. 10) out of the plate members 33 to 36. In this case, the joining between the adjacent plate members 33 and 35 can be strengthened by the L-shaped angle 40 in addition to the fillet weldings S1 to S4 which join the plate members 33 to 36 with one another. It is optional whether the L-shaped angle 40 is to be provided throughout the overall length of the plate members 33 to 36 or partially in the longitudinal direction. Although the L-shaped angle 40 is illustrated as an example in FIG. 10, a ⊐-shaped reinforcing member may be provided, whereby the joining of three adjacent plate members can be strengthened.

Before combining the plate members 33 to 36, a nut 42 may be mounted (welded) to the surface of any of the plate members 33 to 36 (the inner surface 36a of the rear plate member 36 in FIG. 10) which becomes an inner surface after the combination. In this case, a bolt can be brought into threaded engagement with the nut 42 from the outside of the rear support pillar 22 (23) through a through hole 41 formed in the rear plate member 36.

Further, before the closed section is formed by combining the plate members 33 to 36, fillet welding S5 may be performed also for the inner surface of a specific plate member (the left plate member 34 in FIG. 10), whereby the joining strength of the specific plate member can be further improved.

Figure 11A:
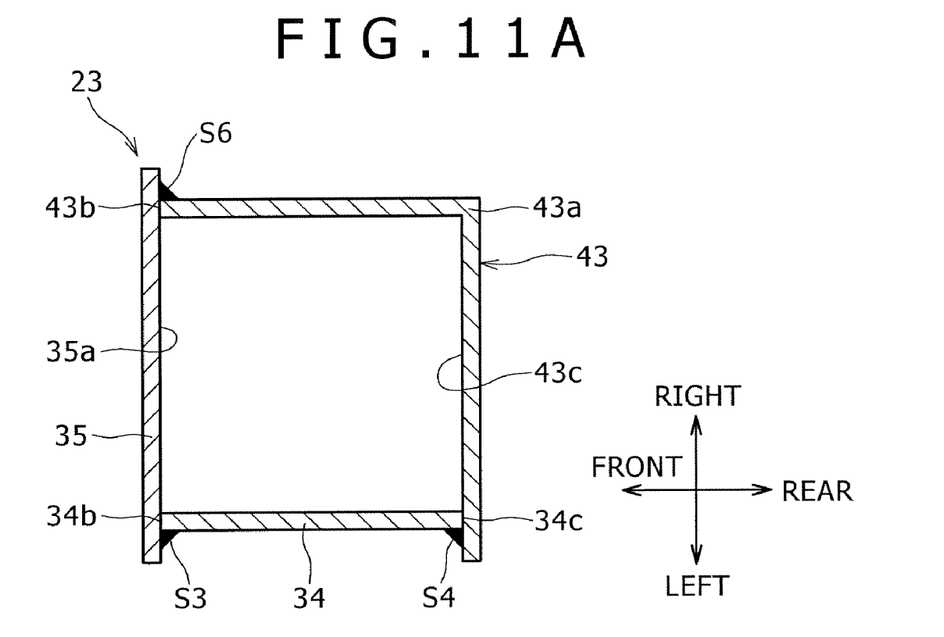

Although the plate members 33 to 36 used in the above embodiment are of a rectilinear section, there also may be adopted such a bent plate member 43 of an L-shaped section as shown in FIG. 11A.

The bent plate member 43, in its sectional shape, has constituent portions corresponding to the right plate member 33 and the rear plate member 36 integrally through a bent portion 43a. Although it is not intended to limit the shape of the bent plate member 43, the reason why the right and rear plate members are formed integrally as shown in the drawing is that the rear support pillars 22 and 23 are required to have a sufficient strength against external forces exerted sideways and from behind.

In a state in which a front end face 43b of the bent plate member 43 is abutted against the inner surface 35a of the front plate member 35, fillet welding S6 is applied to the inner surface 35a throughout the overall length of each plate member, whereby the bent plate member 43 is joined to the front plate member 35. On the other hand, for the left plate member 34, the rear end face 34c of the left plate member 34 is abutted against the inner surface 43c which faces forward and in this state there is performed fillet welding S4, whereby the bent plate member 43 is joined to the left plate member 34 throughout the overall length of each plate member.

By so doing, two faces out of the side faces of the rear support pillars 22 and 23 can be formed by a single bent plate member 43. Thus, in comparison with the case where the two faces are joined by fillet welding S2 of two plate members (the rear plate member 36 and the right plate member 33), the number of working steps for welding plate members can be decreased and the working efficiency in fabricating the rear support pillars 22 and 23 can be improved.

Figure 11B:
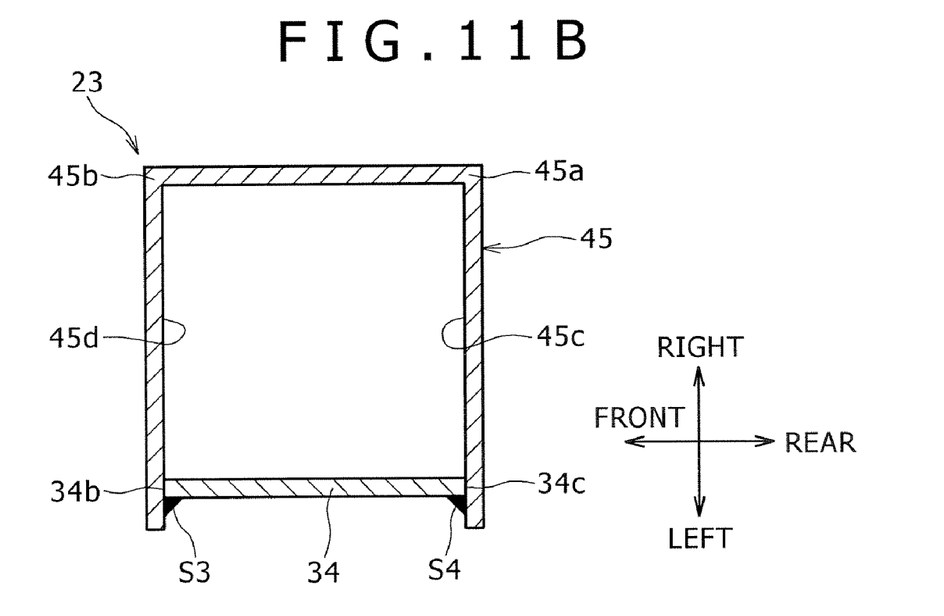

The bent portion 43a is not limited to one portion. As shown in FIG. 11B, there may be adopted a bent plate member 45 of a ⊐-shaped section having two bent portions.

The bent plate member 45, in its sectional shape, has constituent portions corresponding to the right plate member 33, front plate member 35 and rear plate member 36 integrally through a pair of bent portions 45a and 45b.

Both front end and rear end faces 34b and 34c of the left plate member 34 are abutted against inner surfaces 45c and 45d which are opposed to each other longitudinally, and in this state there are performed fillet weldings S3 and S4, whereby the bent plate member 45 is joined to the left plate member 34 throughout the overall length of each plate member.

In this configuration, three faces out of the side faces of the rear support pillars 22 and 23 can be formed by a single bent plate member 45. Therefore, in comparison with the case where the three faces are joined by fillet weldings S1 and S2 of three plate members (the front and rear plate members 35 and 36 and the right plate member 33), the number of working steps for welding plate members can be decreased.

Also in case of combining another L-shaped bent plate member 46 (see FIGS. 12A and 12B) with the bent plate member 43 shown in FIG. 11A, it is possible to form the rear support pillars 22 and 23.

Figure 12A:
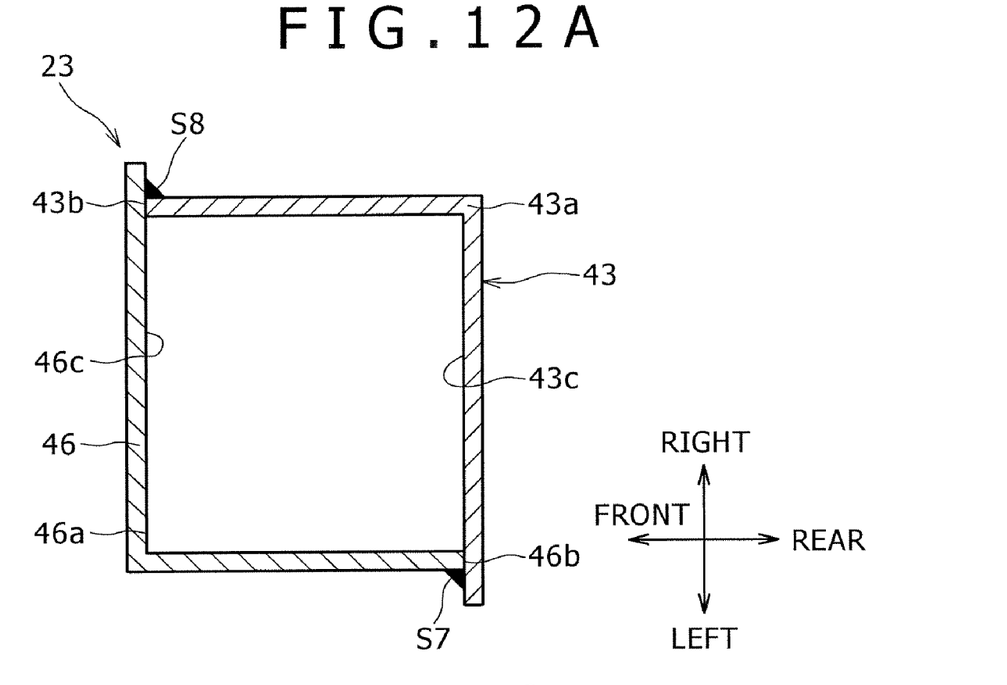

The bent plate member 46, in its sectional shape, has constituent portions corresponding to the front plate member 35 and the left plate member 34 integrally through a bent portion 46a.

In a state in which a rear end face 46b of the bent plate member 46 is abutted against an inner surface 43c of the bent plate member 43, fillet welding S7 is performed for the inner surface 43c throughout the overall length of each plate member, whereby the bent plate member 46 is joined to the bent plate member 43. On the other hand, as to the bent plate member 43, its front end face 43b is abutted against an inner surface 46c of the bent plate member 46 and in this state fillet welding S8 is performed for the inner surface 46c throughout the overall length of each plate member, whereby the bent plate member 43 is joined to the bent plate member 46.

Figure 12B:
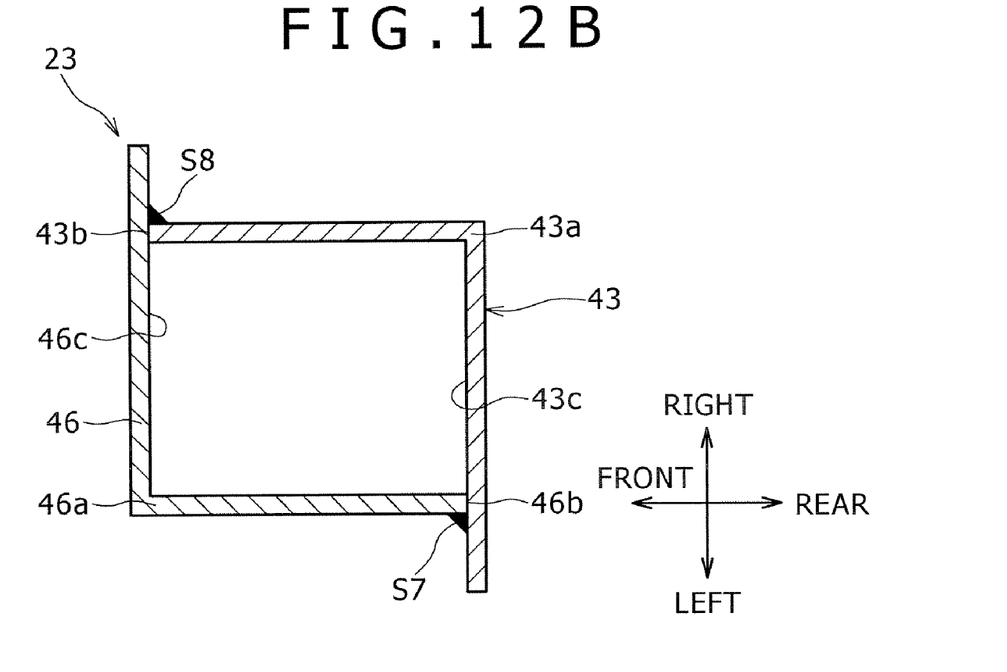

Thus, as shown in FIG. 12B, the sectional shape of the rear support pillars 22 and 23 can be changed by changing the positions of fillet weldings S7 and S8, so that the strength and sectional shape of the rear support pillars 22 and 23 can be adjusted while using the common bent plate members 43 and 46.

Although the invention has been described with reference to the preferred embodiments in the attached figures, it is noted that equivalents may be employed and substitutions made herein without departing from the scope of the invention as recited in the claims.

We claim:

1. A cab of a working machine, comprising:
   a plurality of support pillars erected around an operator's seat of the working machine, said cab enclosing said operator's seat to protect the seat,
   wherein the entire length of at least one of said support pillars is configured by a combined support pillar formed by combining a plurality of plate members extending in a longitudinal direction of the support pillar concerned to define a closed section, and in said closed section, an end face in a transverse direction of one of adjacent plate members of the plate members is abutted against an inner surface of the other plate member and in this state the abutted portion of the plate members is fillet-welded substantially throughout the overall length of each of the plate members, wherein said combined support pillar includes a support pillar erected behind said operator's seat, wherein said plate members include a pair of opposed plate members disposed so that respective inner surfaces confront each other and a pair of interposing plate members interposed between the inner surfaces of said opposed plate members, and a closed section of a quadrangular shape is formed by said opposed plate members and said interposing plate members, and wherein said opposed plate members are disposed in such a manner that the respective inner surfaces confront each other in the longitudinal direction of the working machine.

2. The cab of a working machine according to claim 1, wherein said opposed plate members are disposed in such a manner that the respective inner surfaces confront each other in the longitudinal direction of the working machine.

3. The cab of a working machine according to claim 1, wherein one of said plate members has at least one bent portion in said closed section.

4. The cab of a working machine according to claim 1, wherein at least one said plate member formed with said end face is fillet-welded on both its surface side and back side to the inner surface of the mating plate member.

5. A cab of a working machine, comprising:

a plurality of support pillars erected around an operator's seat of the working machine, said cab enclosing said operator's seat to protect the seat, wherein at least one of said support pillars is configured by a combined support pillar formed by combining a plurality of plate members extending in a longitudinal direction of the support pillar concerned to define a closed section, and in said closed section, an end face in a transverse direction of one of adjacent plate members of the plate members is abutted against an inner surface of the other plate member and in this state the abutted portion of the plate members is fillet-welded substantially throughout the overall length of each of the plate members, wherein said plate members include a pair of opposed plate members disposed so that respective inner surfaces confront each other and a pair of interposing plate members interposed between the inner surfaces of said opposed plate members, and a closed section of a quadrangular shape is formed by said opposed plate members and said interposing plate members, wherein said opposed plate members are disposed in such a manner that the respective inner surfaces confront each other in the longitudinal direction of the working machine.

* * * * *